(12) United States Patent
Nakasone

(10) Patent No.: US 10,612,279 B2
(45) Date of Patent: Apr. 7, 2020

(54) LOCK DEVICE

(71) Applicant: PIOLAX, INC., Yokohama-shi (JP)

(72) Inventor: Hisashi Nakasone, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 15/777,331

(22) PCT Filed: Nov. 18, 2016

(86) PCT No.: PCT/JP2016/084218
§ 371 (c)(1),
(2) Date: May 18, 2018

(87) PCT Pub. No.: WO2017/086426
PCT Pub. Date: May 26, 2017

(65) Prior Publication Data
US 2018/0328087 A1 Nov. 15, 2018

(30) Foreign Application Priority Data
Nov. 20, 2015 (JP) ................... 2015-227954

(51) Int. Cl.
*E05B 83/30* (2014.01)
*B60R 7/06* (2006.01)
(Continued)

(52) U.S. Cl.
CPC ............... *E05B 83/30* (2013.01); *B60R 7/06* (2013.01); *E05C 9/006* (2013.01); *E05C 9/047* (2013.01); *E05B 85/06* (2013.01)

(58) Field of Classification Search
CPC .......... E05B 83/00; E05B 83/30; E05B 85/06; B60R 7/06; E05C 9/006; E05C 9/047
(Continued)

(56) References Cited

U.S. PATENT DOCUMENTS 1,761,092 A * 6/1930 Shinn ...................... E05B 9/086
70/368
1,930,975 A * 10/1933 Jacobi ..................... E05B 9/086
70/216
(Continued)

FOREIGN PATENT DOCUMENTS

JP 2014-173287 A 9/2014
WO WO 2014/030531 A1 2/2014

OTHER PUBLICATIONS

International Search Report (ISR) (PCT Form PCT/ISA/210), in PCT/JP2016/084218, dated Jan. 24, 2017.
(Continued)

*Primary Examiner* — Suzanne L Barrett
(74) *Attorney, Agent, or Firm* — McGinn I.P. Law Group, PLLC.

(57) ABSTRACT

A lock device for holding an openable and closable member in a closed state. The lock device includes a base member, an operation member, a rod, and a cylinder lock. The cylinder lock has a protruding portion biased to protrude radially outwards to be engaged with an engaging portion formed on a rear side of a cylinder accommodating portion. The rod has a distal end portion configured to move out of a through hole formed in the openable and closable member to be engaged with a locking portion on a fixed member over a predetermined length with the openable and closable member left in a locked state, and a pushing portion enables a release of an engagement with the engaging portion when the rod moves in a receding direction to abut with the protruding portion, causing the protruding portion to recede against a biasing force.

12 Claims, 11 Drawing Sheets

(51) Int. Cl.
 *E05C 9/00* (2006.01)
 *E05C 9/04* (2006.01)
 *E05B 85/06* (2014.01)

(58) Field of Classification Search
 USPC .................................. 70/162, 368, 370, 371
 See application file for complete search history.

(56) References Cited

U.S. PATENT DOCUMENTS

| | | | | |
|---|---|---|---|---|
| 2,059,697 | A * | 11/1936 | Jacobi | E05B 9/086 |
| | | | | 70/368 |
| 3,824,817 | A * | 7/1974 | Orr | E05B 9/084 |
| | | | | 292/147 |
| 4,202,587 | A * | 5/1980 | Wieland | E05B 9/084 |
| | | | | 312/219 |
| 4,471,638 | A * | 9/1984 | Scheerhorn | E05B 9/086 |
| | | | | 70/368 |
| 6,874,340 | B1 * | 4/2005 | Berman | E05B 9/084 |
| | | | | 70/160 |
| 7,650,769 | B2 * | 1/2010 | Lo | E05B 9/086 |
| | | | | 70/368 |
| 8,584,495 | B2 * | 11/2013 | Chiou | E05B 9/084 |
| | | | | 70/367 |
| 2007/0080542 | A1 * | 4/2007 | Ookawara | E05B 83/30 |
| | | | | 292/36 |
| 2011/0174027 | A1 * | 7/2011 | Ookawara | E05B 83/30 |
| | | | | 70/159 |
| 2015/0008680 | A1 * | 1/2015 | Suzuki | B60R 7/06 |
| | | | | 292/32 |
| 2019/0040663 | A1 * | 2/2019 | Ruzich | E05C 9/04 |

OTHER PUBLICATIONS

International Search Report (ISR) (PCT Form PCT/ISA/237), in PCT/JP2016/084218, dated Jan. 24, 2017.

* cited by examiner

LOCK DEVICE

TECHNICAL FIELD

The present invention relates to a lock device to be mounted on an openable and closable member.

BACKGROUND ART

A lock device is mounted on an openable and closable member for opening and closing an opening of a glove box of a vehicle to hold the openable and closable member in a closed state. A user operates an operation member of the lock device to unlock the lock device to open the glove box.

A lock device of a lid disclosed in Patent Document 1 includes a housing fixed to the lid, an operation member mounted slidably on the housing, a rotary member supported rotatably on the housing, a pair of rods coupled individually to the rotary member and a key cylinder mounted on the housing. This lock device is accommodated in an interior space defined by a panel and a box of the lid.

The key cylinder disclosed in Patent Document 1 has a cylindrical case held in the housing, a rotational element disposed rotatably within the case, and a flange-shaped protruding portion protruding radially outwards from the rotational element. The key cylinder is prevented from being dislocated from the housing as a result of the protruding portion being hooked on a rear edge of a mounting hole.

PRIOR ART DOCUMENT

Patent Document

Patent Document 1: International Publication No. 2014-030531

SUMMARY OF INVENTION

Problems to be Solved by Invention

In the technique disclosed in Patent Document 1, when it becomes necessary to replace key cylinders, there are two methods: one method is to replace a whole lid including a key cylinder with another whole lid including another key cylinder; and the other method is to release the dislocation preventive mechanism effected by the protruding portion of the key cylinder by disassembling the lid to the panel and the box. The method of replacing the whole lid to replace the key cylinder is costly. In the case where the panel and the box of the lid are fastened together through welding or the like, it is not easy to disassemble the lid, and there are fears that the lid is damaged during disassembling.

The invention has been made in view of these problems, and an object thereof is to provide a lock device capable of facilitating a removal of a key cylinder.

Means for Solving Problems

To solve the problem, according to an aspect of the invention, there is provided a lock device capable of holding an openable and closable member in a closed state, the openable and closable member being mounted on an opening portion of a fixed member so as to be opened and closed, the lock device including: a base member fixed to the openable and closable member; an operation member supported on the base member; a rod configured to reciprocate in association with operations of the operation member to thereby be brought into engagement with and disengagement from a locking portion on the fixed member; and a cylinder lock disposed in a cylinder accommodating portion formed in the base member or the operation member. The cylinder lock has a protruding portion configured to be biased to protrude radially outwards to thereby be brought into engagement with an engaging portion formed on a rear side of the cylinder accommodating portion. The rod has a distal end portion configured to move out of a through hole formed in the openable and closable member to be brought into engagement with the locking portion on the fixed member over a predetermined length with the openable and closable member left in a locked state and a pushing portion enabling a release of an engagement with the engaging portion when the rod moves in a receding direction to be brought into abutment with the protruding portion, causing the protruding portion to recede against a biasing force.

According to another aspect of the invention, there is provided a lock device capable of holding an openable and closable member in a closed state, the openable and closable member being mounted on an opening portion of a fixed member so as to be opened and closed. The lock device includes a base member fixed to the openable and closable member, an operation member supported on the base member, a rod configured to reciprocate in association with operations of the operation member to thereby be brought into engagement with and disengagement from a locking portion on the fixed member, and a cylinder lock disposed in a cylinder accommodating portion formed in the base member or the operation member. The cylinder lock has a protruding portion configured to be biased to protrude radially outwards to thereby be brought into engagement with an engaging portion formed on a rear side of the cylinder accommodating portion. The protruding portion is disposed so that a rod-shaped body inserted in a through hole formed in a side wall of the openable and closable member can be brought into abutment therewith, and the through hole is not exposed with the openable and closable member left in the closed state.

Advantageous Effects of Invention

According to the invention, the lock device can be provided which enables a removal of the cylinder lock.

EMBODIMENTS OF INVENTION

Figure 1:
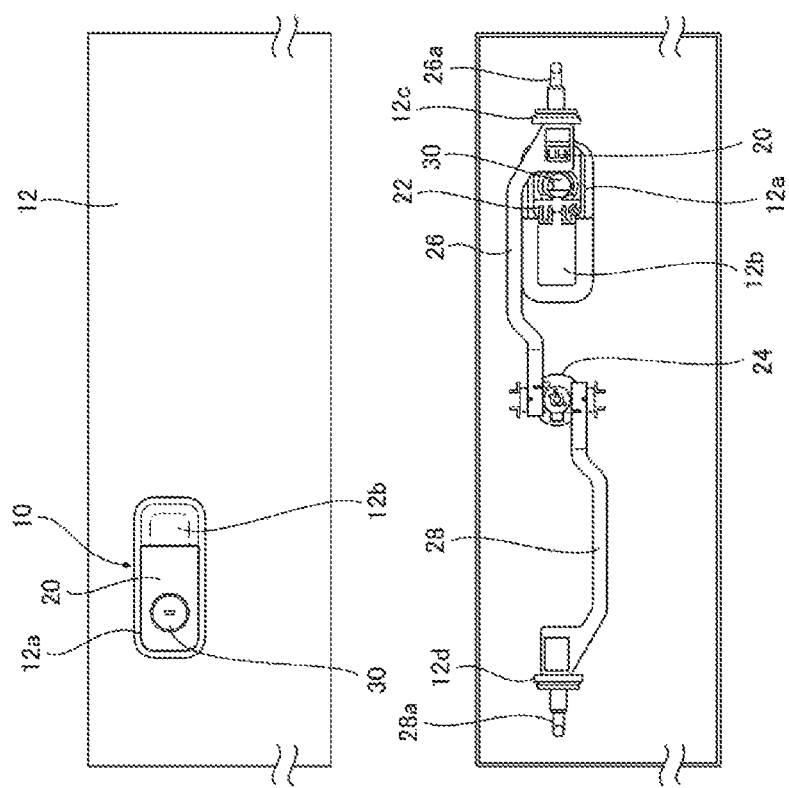
FIGS. 1A and 1B show explanatory drawings of a lock device according a first embodiment.

FIGS. 1A and 1B show explanatory drawings of a lock device 10 according to a first embodiment. FIG. 1A is a front view of the lock device 10 and an openable and closable member as seen from a front side of the openable and closable member, and FIG. 1B is a rear view of the lock device 10 and the openable and closable member as seen from a rear side of the openable and closable member. In reality, the openable and closable member is provided by affixing two plate-shaped members together and accommodates the lock device 10 in an interior space thereof. However, in FIG. 1B, the lock device 10 and the openable and closable member are shown with a rear inner member of the openable and closable member covering the lock device 10 omitted from illustration.

The openable and closable member 12 is, for example, a lid member for a glove box of a vehicle. Although an outer member of the openable and closable member 12 is shown as having a flat planar shape as a matter of conveniences in illustration in FIGS. 1A and 1B, in reality, the outer member of the openable and closable member 12 is formed to match the shape of an opening portion of the glove box and hence may be formed into the shape of a curved plane. The glove box is a fixed member having a recess which is an accommodation space provided in a dashboard, and the openable and closable member 12 is mounted rotatably on the glove box to open and close an opening portion of the recess. With the openable and closable member 12 left in a closed state, the outer member is exposed to a front of a front passenger's seat, and the inner member is located in an interior of the recess. Alternatively, an accommodating portion may be provided on the openable and closable member, causing a glove box itself to function as an openable and closable member, and the accommodating space of the glove box may be opened by rotating the glove box.

A mounting opening 12a is formed in the openable and closable member 12 for the lock device 10 to be mounted therein. The lock device 10 mounted on the openable and closable member 12 holds the openable and closable member 12 in a closed state relative to the opening portion of the glove box with the openable and closable member 12 locked. The lock device 10 of the embodiment is a side lock device in which an operation member 20 can be operated in a width direction of the openable and closable member 12.

The lock device 10 includes the operation member 20, a base member 22, a rotary member 24, a first rod 26, a second rod 28 and a cylinder lock 30. The lock device 10 is provided in a space defined between the outer member and the inner member of the openable and closable member 12. The base member 22 is fixed to the openable and closable member 12. The operation member 20 is supported rotatably on the base member 22. As shown in FIG. 1A, the operation member 20 is exposed to a front side of the mounting opening 12a. A user inserts his or her finger from a depressed portion 12b into a rear side of the operation member 20 and the pulls up the operation member 20 to release the openable and closable member 12 from a locked state.

The rotary member 24 is supported rotatably on the openable and closable member 12 and is coupled to the first rod 26 and the second rod 28 (the first rod 26 and the second rod 28 are referred to simply as a rod or rods in the case where no discrimination is necessary between them). An operation force exerted by the user is transmitted from the operation member 20 to the first rod 26 shown in FIG. 1B, then from the first rod 26 to the rotary member 24, and further from the rotary member 24 to the second rod 28. The rotary member 24 rotates in response to a rotation of the operation member 20. The rods reciprocate in a longitudinal direction in association with rotations of the rotary member 24. The rods can be brought into engagement with and disengagement from lock holes in the fixed member in association with rotations of the operation member 20, that is, can be brought into engagement with the lock holes and disengagement from the lock holes.

The first rod 26 is passed through a first supporting hole portion 12c of the openable and closable member 12, and the second rod 28 is passed through a second supporting hole portion 12d of the openable and closable member 12. When a rear side of the lock device 10 is covered to be hidden by the inner member of the openable and closable member which is not shown in FIG. 1B, a distal end portion 26a of the first rod 26 is exposed to an exterior portion and a distal end portion 28a of the second rod 28 is exposed to an exterior portion, while a distal end portion of the second rod 28 is exposed to an exterior portion. In the first rod 26 and the second rod 28, ends inserted into a first lock hole and a second lock hole of the glove box are referred to as distal ends, whereas ends coupled to the rotary member 24 are referred to as proximal ends.

The first supporting hole portion 12c and the second supporting hole portion 12d of the openable and closable member 12 are formed to penetrate wall portions which project from a rear surface of the openable and closable member 12. An elastic portion may be provided on each of circumferential edges of through holes in the first supporting hole portion 12c and the second supporting hole portion 12d so as to be brought into elastic contact with the rod to guide a movement of the rod while suppressing the looseness of the rod.

The cylinder lock 30 is provided in the operation member 20 and is exposed to a front surface of the openable and closable member 12 together with the operation member 20. With the cylinder lock 30 staying in its locking state, a rotation of the operation member 20 in an opening direction is restricted by the cylinder lock 30, whereby the openable and closable member 12 cannot be unlocked, and the openable and closable member 12 is held in a locked state. With the cylinder lock 30 staying its unlocking state, the operation member 20 is not restricted from rotating by the cylinder lock 30, whereby the openable and closable member 12 can be unlocked by operating or rotating the operation member 20.

The rotary member 24 rotates when the user operates the operation member 20, and the rods move into and out of the lock holes formed in the glove box which is the fixed member as the rotary member 24 rotates. The openable and closable member 12 is locked when the distal end portions of the rods move into the corresponding lock holes in the glove box, while the openable and closable member 12 is in unlocked state when the distal ends of the rods move out of the corresponding lock holes. Directions in which the rods move into the corresponding lock holes are referred to as traveling directions of the rods, while directions in which the rods move out of the corresponding lock holes are referred to as receding directions of the rods.

The rotary member 24 has a spring member (not shown) provided thereon to bias the rods in their traveling directions. The rotary member 24 has a rotation preventive means for preventing a rotation of the rotary member 24 by being brought into abutment with the openable and closable member 12 against the biasing by the spring member. With the spring member left in a free state, the rotary member 24 is prevented from rotating by the rotation preventive means. Additionally, another spring member (not shown) is provided on the operation member 20 to bias the operation member 20 into a closed state.

Figure 2:
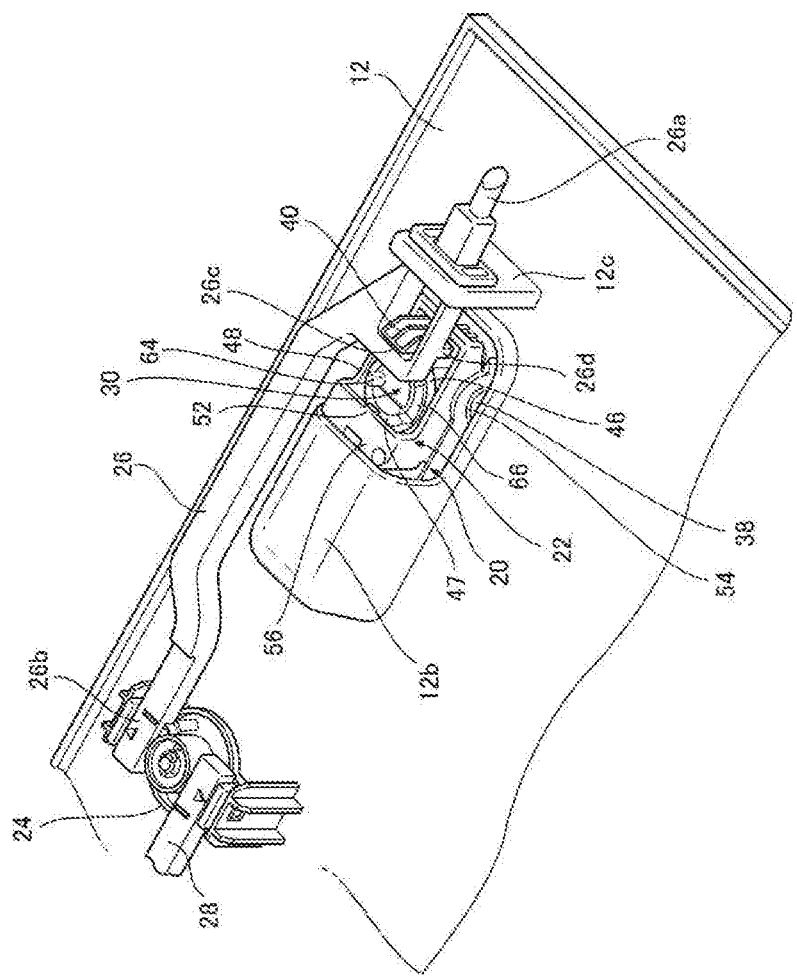
FIG. 2 is a partial perspective view of the lock device and an openable and closable member.
Figure 3A:
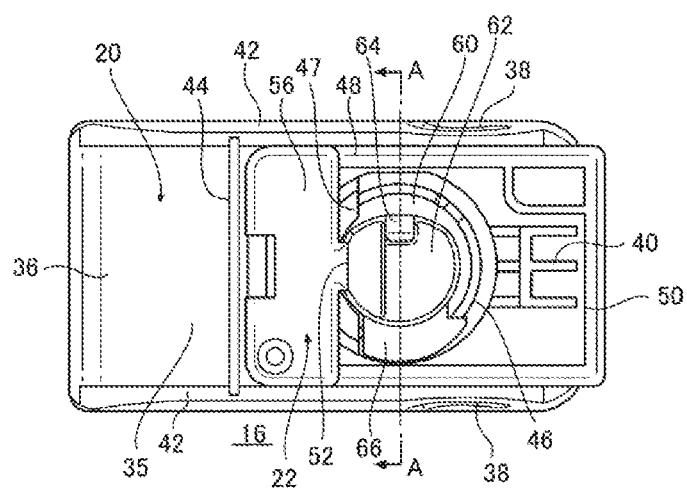
FIG. 3A is a rear view of a subassembly made up of an operation member, a base member and a cylinder lock.
Figure 3B:
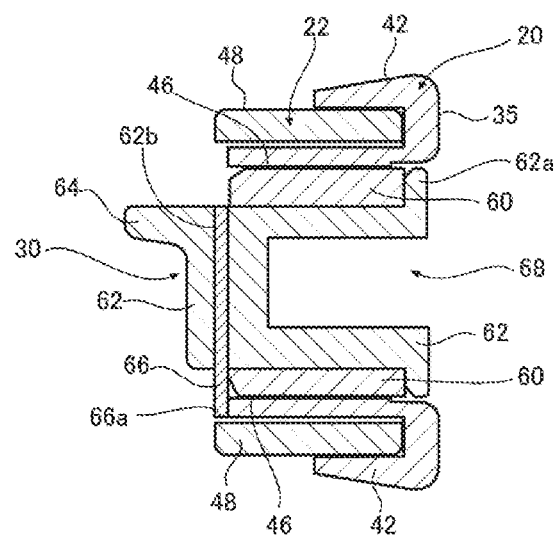
FIG. 3B is a sectional view of the subassembly shown in FIG. 3A taken along a line A-A in FIG. 3A.

FIG. 2 is a partial perspective view of the lock device 10 and the openable and closable member 12. FIG. 3A is a rear view of a subassembly 16 which is made up of the operation member 20, the base member 22 and the cylinder lock 30. FIG. 3B is a sectional view of the subassembly 16 shown in FIG. 3A taken along a line A-A in FIG. 3A. In FIGS. 3A and 3B, the cylinder lock 30 is illustrated as staying in the unlocking state.

The subassembly 16 shown in FIG. 3A as being made up of the operation member 20, the base member 22 and the cylinder lock 30 is mounted in the mounting opening 12a of the openable and closable member 12 shown in FIG. 2. The operation member 20 has a base portion 35, an operating portion 36, a pair of shaft portions 38, a transmitting portion 40, a pair of side wall portions 42, a middle wall portion 44 and a cylinder bore 46. The operating portion 36 is formed on the base portion 35 having a flat plate shape and is positioned on the front side of the openable and closable member 12 so that a finger of a hand of the user is hooked on the operating portion 36.

The pair of side wall portions 42 are erected to face each other on a rear surface of the base portion 35. The pair of shaft portions 38 are formed individually into an arc shape on the pair of side wall portions 42. The pair of shaft portions 38 are disposed nearer to the transmitting portion 40 than the operating portion 36 in a reciprocating direction of the rods or in a transverse direction of the vehicle.

The middle wall portion 44 is erected on the rear surface of the base portion 35 to couple the pair of side wall portions 42 together. The middle wall portion 44 covers an internal structure of the lock device 10 to prevent the finger of the hand of the user from entering an interior portion of the lock device 10.

The transmitting portion 40 has a pillar-like shape and is erected from the rear surface of the base portion 35 to project to the rear side of the openable and closable member 12 as shown in FIG. 2. The transmitting portion 40 is brought into engagement with a bearing surface 26c of the first rod 26 to transmit an operation force exerted on the operation member 20 to the first rod 26.

As shown in FIGS. 3A and 3B, the cylinder bore 46 penetrates the base portion 35 between the transmitting portion 40 and the middle wall portion 44 and is formed into a cylindrical shape. An inward flange 47, protruding radially inwards, is formed at an end portion on a rear side of the cylinder bore 46. The inward flange 47 is formed into a substantially semi-arc shape and restricts the cylinder lock 30 from moving axially rearwards. The cylinder bore 46 functions as a cylinder accommodating portion for accommodating therein the cylinder lock 30 while exposing an inserting opening 68 for the cylinder lock 30.

The base member 22 has a base frame portion 48, a passage portion 50, a stopper portion 52, a pivotally supporting portion 54 and a seat portion 56. A locking means for fixing the base member 22 to the openable and closable member 12 is publicly known, and hence, a description thereof will be omitted here.

The passage portion 50 is formed in the base frame portion 48 so as to penetrate the base frame portion 48 to allow the transmitting portion 40 of the operation member 20 to pass therethrough to the rear side of the openable and closable member 12. The pivotally supporting portion 54 is formed into the shape of an arc-like projection. In this embodiment, a pair of pivotally supporting portions 54 is formed on both side surfaces of the base frame portion 48. The pivotally supporting portions 54 are inserted into the corresponding shaft portions 38 to support the operation member 20 rotatably.

The seat portion 56 is formed into the shape of a flat plate on a rear bottom of the base frame portion 48. The stopper portion 52 is formed at a central edge of the seat portion 56 and is brought into engagement with a projecting portion 64 of the cylinder lock 30 when the cylinder lock 30 is in the locking state.

The rotary member 24 is positioned at a center of the openable and closable member 12 and is supported rotatably on the openable and closable member 12. A first coupling portion 26b at a proximal end side of the first rod 26 and a second coupling portion 28b at a proximal end side of the second rod 28 are coupled to the rotary member 24.

The first rod 26 and the second rod 28 have the same shape and hence share parts in common, whereby the production costs are suppressed. The first rod 26 has the bearing surface 26c which is brought into abutment with the transmitting portion 40 of the operation member 20.

The cylinder lock 30 has an outer cylinder portion 60, an inner cylinder portion 62, the projecting portion 64, a protruding portion 66 and an inserting opening 68, as shown in FIGS. 3A and 3B. An interior configuration of the cylinder lock 30 is publicly known, and hence, a detailed description thereof will be omitted here.

The outer cylinder portion 60 is formed into the shape of a cylinder and is accommodated in the cylinder bore 46 in the operation member 20 for engagement with an inner circumferential surface of the cylinder bore 46. A recess and a projection are formed on the outer cylinder 60 and the inner circumferential surface of the cylinder bore 46 so as to be brought into engagement with each other, whereby a relative rotation between the outer cylinder portion 60 and the operation member 20 is restricted. The outer cylinder portion 60 is brought into engagement with the inwards flange 47 on the operation member 20 at a rear edge thereof, whereby the outer cylinder portion 60 is restricted from moving axially to the rear side of the openable and closable member 12.

The inner cylinder portion 62 is inserted into the outer cylinder portion 60 as shown in FIG. 3B and is then provided so as to rotate relative to the outer cylinder portion 60. An inserting opening 68, into which a key is to be inserted, is formed in the inner cylinder portion 62. The inner cylinder portion 62 has a flange 62a which protrudes radially outwards at one end and an inserting hole 62b into which a protruding portion 66 is to be inserted at the other end. The inner cylinder portion 62 is restricted from moving in an axial direction relative to the outer cylinder portion 60 by the flange 62a and the protruding portion 66 provided at the other end thereof.

The projecting portion 64 is formed on a rear surface of the inner cylinder 62 so as to project into a pillar shape in the axial direction and is positioned eccentrically relative to a center axis of the inner cylinder 62. Although the projecting portion 64 is shown as being left in an unlocking state in FIG. 3A, when in a locking state, the projecting portion 64 is brought into abutment with the stopper portion 52 of the base member 22 to restrict the operation member 20 from moving in the opening direction.

The protruding portion 66 is formed into the shape of a flat plate and is inserted into the inserting hole 62b so as to be at right angles to an axial direction of the cylinder lock 30. The protruding portion 66 protrudes radially outwards beyond an outer circumferential surface of the inner cylinder portion 62 and an outer circumferential surface of the outer cylinder 60 and is then brought into engagement with a rear edge of the cylinder bore 46 in the operation member 20 to thereby prevent the cylinder lock 30 from being dislocated to the front side of the operation member 20. In this embodiment, the rear edge of the cylinder bore 46 is brought into engagement with the protruding portion 66 and functions as an engaging portion which restricts the cylinder lock 30 from moving axially to the front side of the operation member 20.

The protruding portion 66 can move in a radial direction and is biased in the radial direction by a biasing means, not shown. Pushing in the protruding portion 66 so as to cause it to recede in the radial direction releases an engagement of the protruding portion 66 with the rear edge of the cylinder bore 46, allowing the cylinder lock 30 to move in the axial direction to the front side of the operation member 20.

How to mount the cylinder lock 30 in the operation member 20 will be described. The cylinder lock 30 is inserted into the cylinder bore 46 from the front side of the operation member 20. The protruding portion 66 is pressed by the inner circumferential surface of the cylinder bore 46 to stay in its receding position in the midst of inserting the cylinder lock 30 into the cylinder bore 46. When the outer cylinder portion 60 comes into abutment with the inward flange 47 of the operation member 20 to complete the insertion of the cylinder block 30, the protruding portion 66 is allowed to protrude radially outwards by means of a biasing force of the biasing means to come into engagement with the rear edge of the cylinder bore 46, whereby the cylinder lock 30 is mounted completely in the operation member 20.

Figure 4:
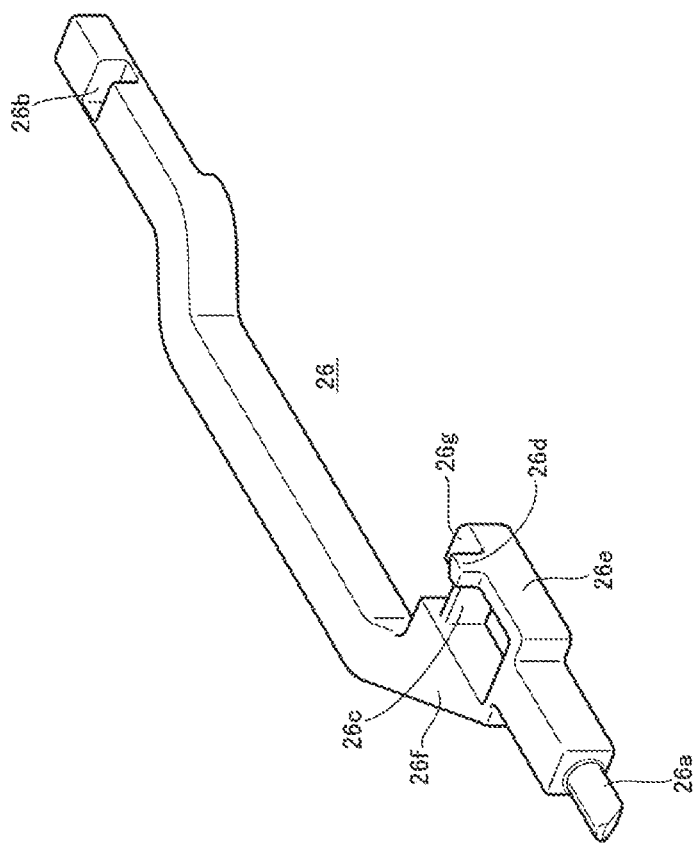
FIG. 4 is a perspective view of a first rod.

FIG. 4 is a perspective view of the first rod 26. The first rod 26 has the distal end portion 26a, the first coupling portion 26b, the bearing surface 26c, a pushing portion 26d, a first branch portion 26e, a second branch portion 26f and an end portion 26g. The first rod 26 is curved so as to avoid a contact with the depressed portion 12b, and this can make the openable and closable member thin.

The distal end portion 26a moves into and out of the lock hole in the glove box. The first coupling portion 26b is positioned at the proximal end side and couples to the rotary member 24. The bearing surface 26c extends to intersect a reciprocating direction of the first rod 26 and comes into abutment with the transmitting portion 40 of the operation member 20.

The first branch portion 26e and the second branch portion 26f branch off the distal end portion 26a, extend along an axial direction and are coupled together by the bearing surface 26c. The first branch portion 26e and the second branch portion 26f are offset from a center axis of the distal end portion 26a. The first branch portion 26e and the second branch portion 26f can define a space where the transmitting portion 40 of the operation member 20 is passed on the center axis of the distal end portion 26a.

The pushing portion 26d is formed on the first branch portion 26e so as to project therefrom and extends towards the operation member 20 as shown in FIG. 2. The pushing portion 26d comes into abutment with the protruding portion 66 as a result of the first rod 26 moving in a receding direction and can push the protruding portion 66 so as to cause it to recede.

The end portion 26g of the bearing surface 26c is cut out to be recessed further downwards than the first branch portion 26e and the second branch portion 26f. The bearing surface 26c is positioned so as not to overlap the protruding portion 66 in the axial direction of the cylinder lock 30, and the pushing portion 26d is positioned so as to overlap the protruding portion 66 in the axial direction of the cylinder lock 30. This configuration can prevent the end portion 26g of the bearing surface 26c from interfering with the cylinder lock 30.

Figure 5:
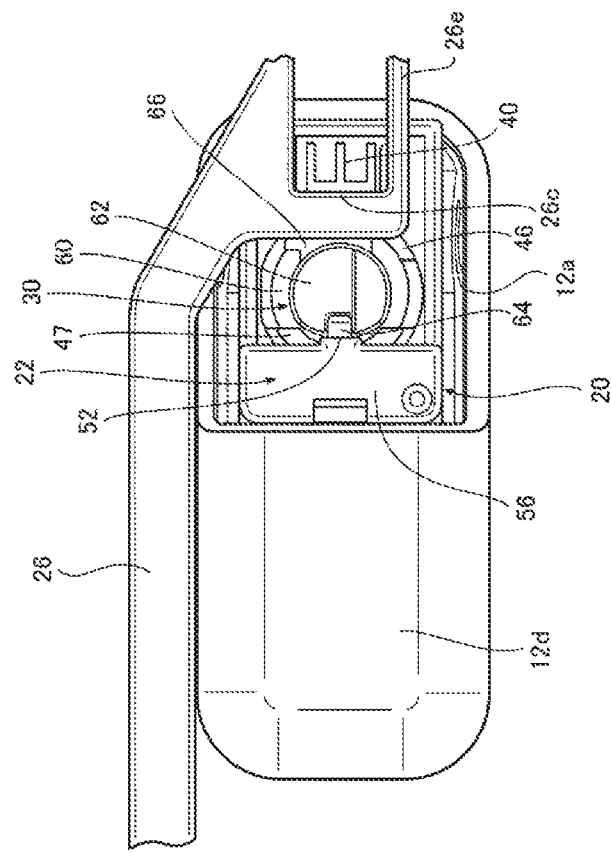
FIG. 5 is an explanatory drawing of the lock device in its locking state.

FIG. 5 is an explanatory drawing of the lock device 10 staying in the locking state. With the cylinder lock 30 staying in its locking state, the inner cylinder portion 62 rotates substantially through 90 degrees, and the projecting portion 64 is in engagement with the stopper portion 52 of the base member 22.

In this state, even when the operation member 20 is attempted to be rotated in the opening direction, the projecting portion 64 comes to strike the stopper portion 52 to restrict the operation member 20 from rotating, whereby the locking of the openable and closable member 12 by the first rod 26 cannot be released.

Incidentally, when the cylinder lock 30 is broken or the key is replaced, the cylinder lock 30 is replaced. Depending on model lines, cylinder locks of doors of a vehicle are common with the cylinder lock 30 of the glove box. In this situation, the cylinder lock 30 of the glove box also has to be replaced when the cylinder locks of the doors of the vehicle are replaced.

It is not easy to remove the lock device 10 accommodated in the openable and closable member 12. In the case where the outer member and the inner member of the openable and closable member 12 are fastened together through vibration welding, the openable and closable member 12 is broken to be disassembled to remove the lock device 10. On the other hand, from an anti-theft point of view, the cylinder lock 30 should be designed so as not to be removed easily.

Then, the lock device 10 of the embodiment is configured so that the cylinder lock 30 cannot be removed with the openable and closable member 12 left in a closed state, while only the cylinder lock 30 is allowed to be removed without disassembling the openable and closable member 12.

Figure 6A:
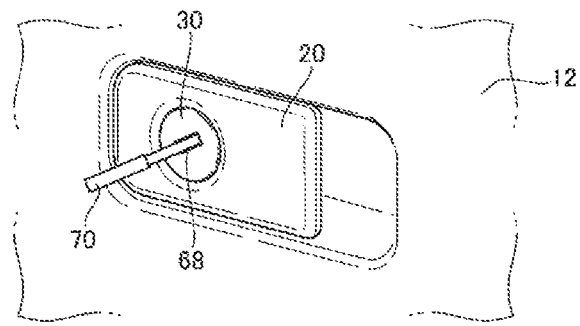
FIGS. 6A to 6C show explanatory drawings of a cylinder lock removing process.
Figure 6B:
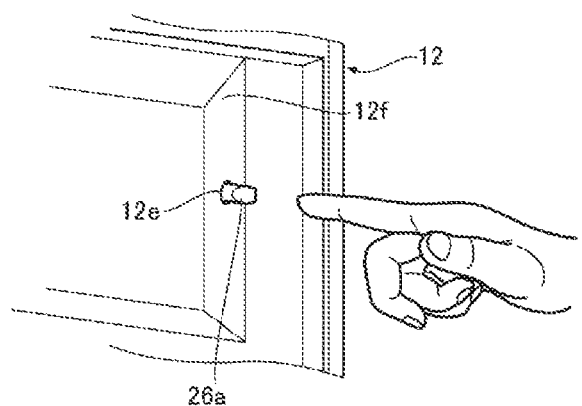
Figure 6C:
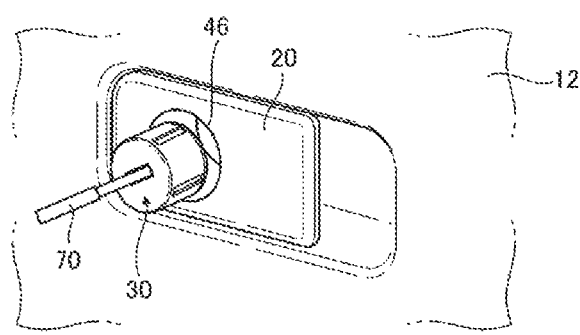

FIGS. 6A to 6C show explanatory drawings of a removing process of the cylinder lock 30. A removing operation of the cylinder lock 30 is performed with the openable and closable member 12 left in an opened state.

As shown in FIG. 6A, the operator inserts a key 70 into the inserting opening 68 of the cylinder lock 30 and turns the key 70 halfway, for example, through 45 degrees. It should be noted that the key 70 needs to be turned through 90 degrees to shift the cylinder lock 30 in the locking state. The key 70 inserted into the inserting opening 68 is designed not to be removed from the inserting opening 68 unless the cylinder lock 30 is in the locking state or the unlocking state. Thus, when the operator pulls the key 70 towards him or her with the key 70 turned halfway, a force can be exerted on the cylinder lock 30 in a direction in which the cylinder lock 30 is disengaged from the operation member 20.

As shown in FIG. 6B, the distal end portion 26a of the first rod 26 projects from a through hole 12e formed in a side wall 12f of the openable and closable member 12. The operator pushes in the distal end portion 26a of the first rod 26 in the receding direction. Although details will be described later, this can release the engagement of the cylinder lock 30 with the operation member 20.

Then, when the operator pulls the key 70 towards him or her as shown in FIG. 6C with the first rod 26 left pushed in, the cylinder lock 30 can be removed from the cylinder bore 46 of the operation member 20. In this way, the cylinder lock 30 can be removed from the openable and closable member 12 through the step of turning the key 70, the step of pushing in the first rod 26 and the step of pulling out the key 70. In addition, the step of pushing in the distal end portion 26a of the first rod 26 cannot be executed unless the openable and closable member 12 is in the opened state, and therefore, the cylinder lock 30 cannot be removed from the openable and closable member 12 which is locked in the closed state, which is preferable from the anti-theft point of view.

Figure 7:
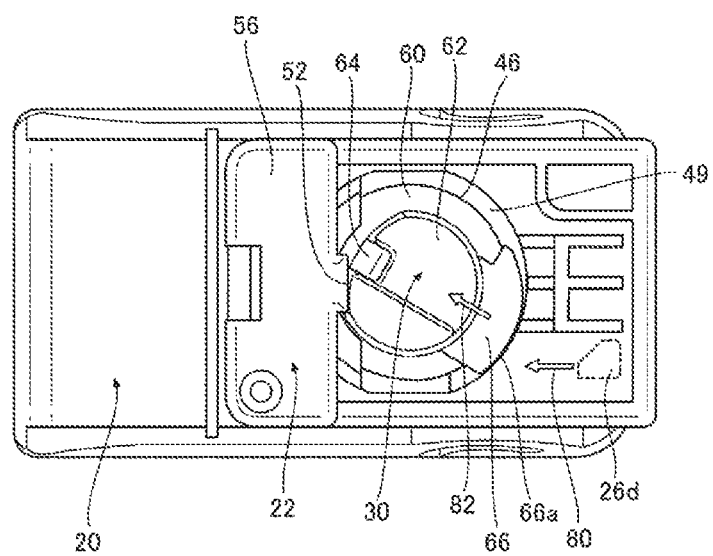
FIG. 7 is an explanatory drawing of the lock device with a key shown in FIG. 6A turned halfway.

FIG. 7 is an explanatory diagram explaining of the lock device 10 with the key 70 turned halfway shown in FIG. 6A. FIG. 7 shows the pushing portion 26d resulting before the first rod 26 is pushed in. As shown in FIG. 7, the inner cylinder portion 62 is rotated through 45 degrees, and the protruding portion 66 is also rotated together with the inner cylinder portion 62. The protruding portion 66 is left in engagement with an engaging portion 49 on the rear edge of the cylinder bore 46 even though it is so rotated.

The protruding portion 66 is positioned on an extension of the receding direction 80 of the pushing portion 26d of the first rod 26 and can move in a radially inward direction 82 in this state. When the first rod 26 is pushed in the receding direction, the pushing portion 26d comes into abutment with an arc-shaped outer circumferential surface 66a of the protruding portion 66.

In case the outer circumferential surface 66a of the protruding portion 66 is configured so as not to be positioned on the extension of the receding direction 80 of the pushing portion 26d unless the key 70 is turned, that is, with the cylinder lock 30 staying in the unlocking state, the protruding portion 66 cannot be caused to recede only by pushing in the first rod 26, whereby it becomes difficult to remove the cylinder lock 30 in an easy fashion.

Figure 8A:
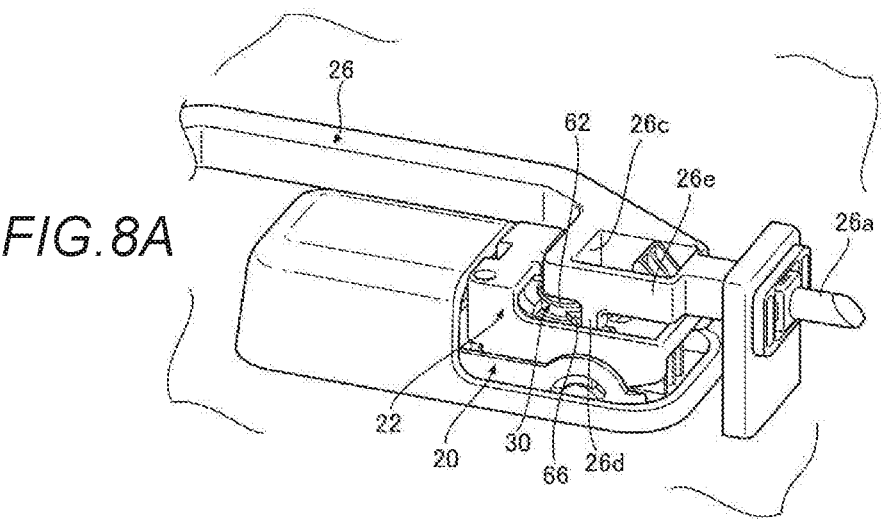
FIGS. 8A and 8B show explanatory drawings of the lock device with the first rod shown in FIG. 6A caused to recede.
Figure 8B:
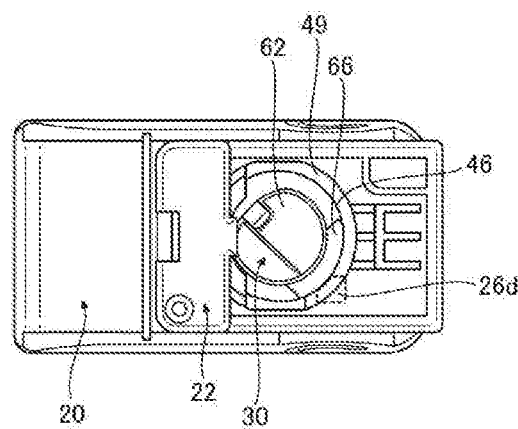

FIGS. 8A and 8B show explanatory drawings of the lock device 10 with the first rod 26 shown in FIG. 6A caused to recede. FIGS. 8A and 8B show states where the protruding portion 66 of the cylinder lock 30 is pushed in as a result of the first rod 26 receding. As shown in FIG. 8A, as a result of the first rod 26 receding, the pushing portion 26d comes into abutment with the protruding portion 66 of the cylinder lock 30 to push in the protruding portion 66.

As shown in FIG. 8B, as a result of the pushing portion 26d pushing in the protruding portion 66, causing the protruding portion 66 to recede radially inwards of the cylinder bore 46, the protruding portion 66 is disengaged from the engaging portion 49. This allows the cylinder lock 30 to move to the front side of the operation member 20, thereby making it possible to remove the cylinder lock 30 from the operation member 20.

Figure 9:
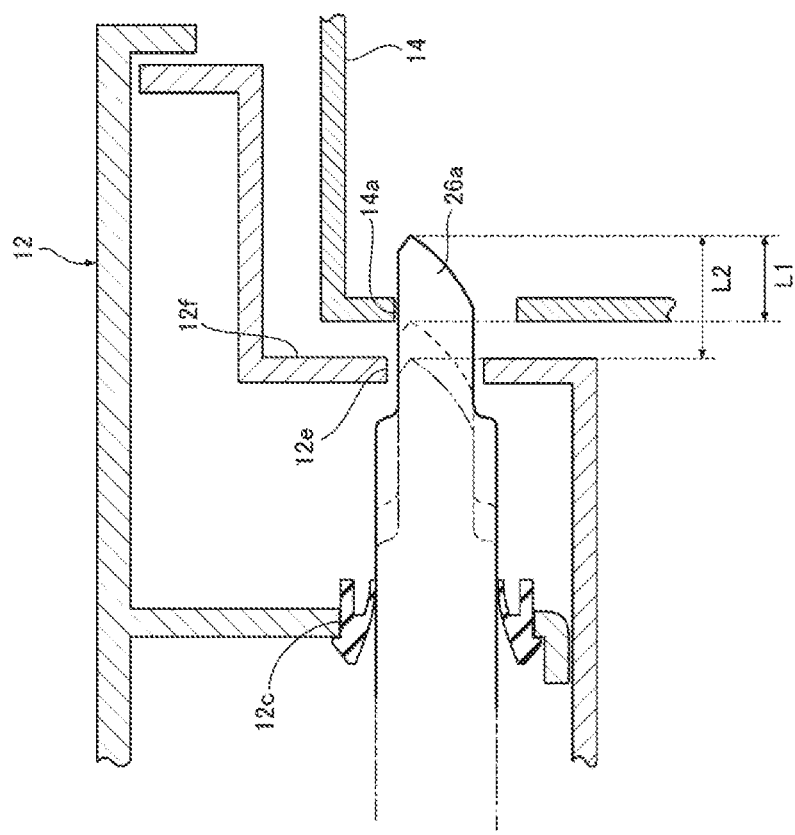
FIG. 9 is an explanatory drawing explaining a push-in length of the first rod in removing the cylinder lock.

FIG. 9 is an explanatory drawing of a push-in length of the first rod 26 in removing the cylinder lock 30. In its free state where no external force is exerted thereon, the first rod 26 is biased in a traveling direction by way of the rotary member 24 by the spring member. The distal end portion 26a of the first rod 26 is out of the through hole 12e formed in the side wall 12f of the openable and closable member 12.

In FIG. 9, the openable and closable member 12 is shown as being left in the locked state, and the distal end portion 26a of the first rod 26 which is in the free state stays in the lock hole 14a in the glove box 14 to be in engagement therewith. The distal end portion 26a of the first rod 26 enters the lock hole 14a a predetermined first length L1 and is in engagement with the lock hole 14a over the first length L1. In closing the openable and closable member 12, the distal end portion 26a of the first rod 26 is brought into abutment with the glove box 14 and then recedes by the first length L1. Then, when the distal end portion 26a enters the lock hole 14a, the distal end portion 26a travels by the first length L1 in the lock hole 14a to be engaged therewith over the first length L1.

Here, the protruding portion 26d of the first rod 26 is disposed so that the engagement of the protruding portion 66 of the cylinder lock 30 with the rear edge of the cylinder bore 46 in the operation member 20 is held engaged even though the first rod 26 recedes by the first length L1. Namely, the pushing portion 26d pushes in the protruding portion 66 against the biasing force of the spring member when the first rod 26 is pushed in up to a second length L2 which is longer than the first length L1 in the receding direction to release the engagement of the protruding portion 66 with the rear edge of the cylinder bore 46.

The operator pushes in the distal end portion 26a over the second length L2 to the side wall 12f to release the engagement of the protruding portion 66 with the rear edge of the cylinder bore 46. Due to this configuration, the pushing portion 26d can be prevented from releasing the engagement of the protruding portion 66 with the rear edge of the cylinder bore 46 even though the first rod 26 recedes in opening and closing the openable and closable member 12.

In a modified example, the pushing portion 26d is designed so as not to release the engagement of the protruding portion 66 with the rear edge of the cylinder bore 46 unless the distal end portion 26a of the first rod 26 recedes deeper than the side wall 12f. This makes it difficult for the cylinder lock 30 to be removed in an easy fashion.

Figure 10A:
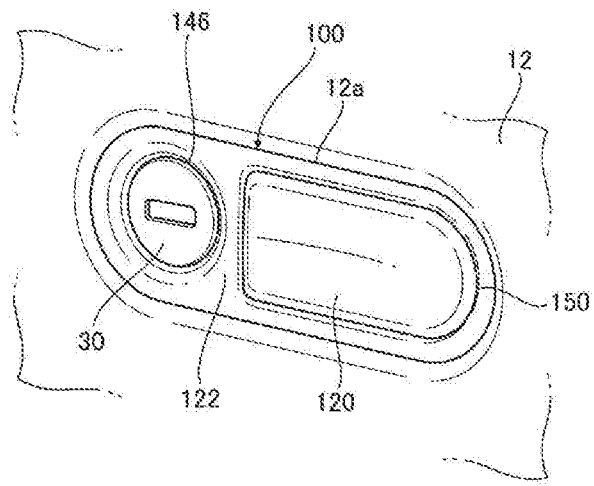
FIGS. 10A and 10B are explanatory drawings of a lock device according to a first modified example.
Figure 10B:
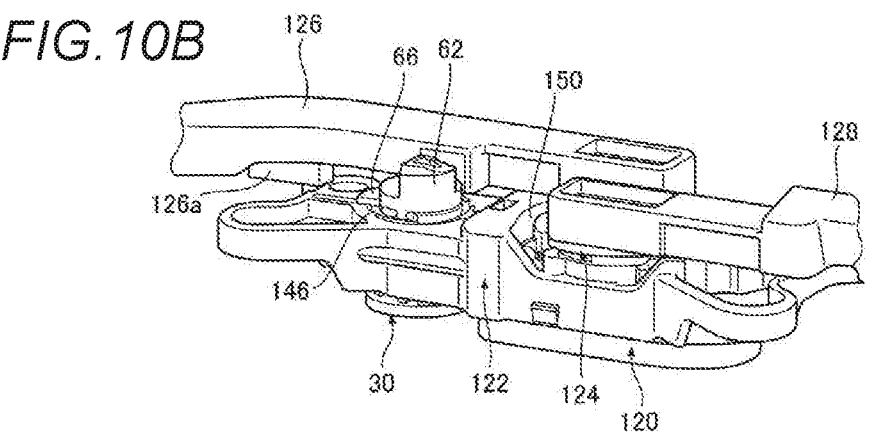

FIGS. 10A and 10B are explanatory drawings of a lock device 100 according to a first modified example. The lock device 100 according to this modified example differs from the lock device 10 shown in FIG. 1A in that an operation member 120 is of a push type, that a cylinder lock 30 is provided in a base member 122 and that the cylinder lock 30 restricts a first rod 126 from moving in its locking state.

The lock device 100 has the base member 122 fixed to a mounting opening 12a of an openable and closable member 12, the operation member supported on the base member 122, a rotary member 124 configured to rotate as the operation member 120 slides, and a first rod 126 and a second rod 128 which reciprocate as the rotary member 124 rotates.

The operation member 120 is accommodated in a passage hole 150 in the base member 122 and is coupled to the rotary member 124. The rotary member 124 is coupled to the first rod 126 and the second rod 128. The first rod 126 and the second rod 128 move into and out of lock holes in a glove box as the operation member 120 is operated.

The user pushing the operation member 120 shown in FIG. 10A, the operation member 120 rotates the rotary member 124, causing the first rod 126 and the second rod 128 to recede, whereby the lock device 100 is released from a locked state.

The cylinder lock 30 is provided in a cylinder bore 146 in the base member 122. The cylinder bore 146 is formed so as to penetrate the base member 122 from a front side to a rear side thereof and has a cylindrical shape. The cylinder lock 30 takes the same mode as that shown in FIG. 3B and is prevented from being dislocated from the cylinder bore 146 by a protruding portion 66 being brought into engagement with a rear edge of the cylinder bore 146.

The first rod 126 has a pushing portion 126a which is formed so as to project towards the base member 122. The pushing portion 126a is positioned so as to overlap the protruding portion 66 in a receding direction of the first rod 126, so that the pushing portion 126a is allowed to be brought into abutment with the protruding portion 66 when the first rod 126 recedes.

In the case where the operator pushes in the first rod 126 more than a predetermined length in the receding direction, the pushing portion 126a comes into abutment with the protruding portion 66, causing the protruding portion 66 to recede in a radial direction, whereby the protruding portion 66 is disengaged from the rear edge of the cylinder bore 146. In this way, even with the lock device 100 using the operation member 120 of the push type, providing the pushing portion 126a on the first rod 126 to push in the protruding portion 66 enables a removal of the cylinder lock 30.

Figure 11:
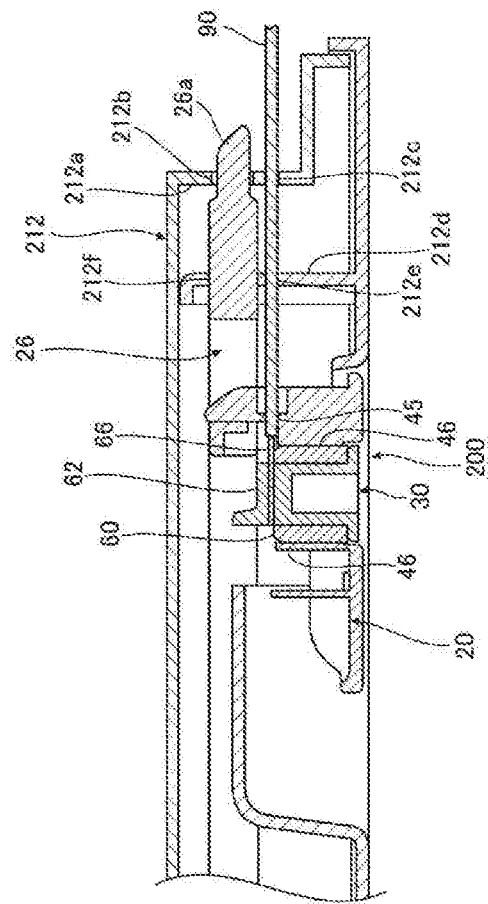
FIG. 11 is an explanatory drawing of a lock device according to a second modified example.

FIG. 11 is an explanatory drawing of a lock device 200 and an openable and closable member 212 according to a second modified example. When compared with the lock device 10 shown in FIG. 8A, the lock device 200 of the second modified example differs from the lock device 10 in that although the protruding portion 66 of the cylinder lock 30 of the lock device 10 is caused to recede by pushing in the first rod 26, a protruding portion 66 of a cylinder lock 30 is caused to recede by using a separate rod-shaped body 90 from a first rod 26. The rod-shaped body 90 is formed into a straight line and is used to remove the cylinder lock 30. Straight paths are formed on the lock device 200 and the openable and closable member 212 so as to allow the rod-shaped body 90 to arrive at the protruding portion 66.

The openable and closable member 212 has a first through hole 212b formed in a side wall 212a to allow a distal end portion 26a of the first rod 26 to project from the side wall 212a therethrough, a second through hole 212c formed in the side wall 212a to allow the rod-shaped body 90 to be inserted into the openable and closable member 212 therethrough, a supporting hole portion 212f formed in a wall portion 212d to guide a reciprocation of the first rod 26, and a first guide hole 212e formed in the wall portion 212d to allow the rod-shaped body 90 to pass therethrough.

When compared with the lock device 10 shown in FIG. 8A, the lock device 200 according to the second modified example differs from the lock device 10 in that a second guide hole 45 is formed to allow the rod-shaped body 90 to pass therethrough into an operation member 20. The second guide hole 45 is formed in a transmitting portion 40 of the operation member 20. The first guide hole 212e and the second guide hole 45 are formed coaxially with the second through hole 212c so as to guide the rod-shaped body 90 passed through the second through hole 212c to the protruding portion 66. The first guide hole 212e and the second guide hole 45 can facilitate an arrival of the rod-shaped body 90 passed through the second through hole 212c at the protruding portion 66.

The protruding portion 66 is disposed coaxially with the second through hole 212c, the first guide hole 212e and the second guide hole 45 so that the rod-shaped body 90 passed through the second through hole 212c can be brought into abutment with the protruding portion 66. The second through hole 212c is formed in the side wall 212a of the openable and closable member 212 as with the first through hole 212b of the first rod 26, and therefore, with the openable and closable member 212 left in a closed state, the second through hole 212c is not exposed, while with the openable and closable member 212 left in an opened state, the second through hole 212c is exposed.

With the openable and closable member 212 left in the opened state, the operator inserts the rod-shaped body 90 through the second through hole 212c and passes the rod-shaped body 90 through the first guide hole 212e and the second guide hole 45, allowing the rod-shaped body 90 to be brought into abutment with the protruding portion 66. The protruding portion 66 is caused to recede by pushing in the rod-shaped body 90 to disengage the protruding portion 66 from a rear edge of a cylinder bore 46, thereby making it possible to remove a cylinder lock 30. With the openable and closable member 212 left in the closed state, the second through hole 212c is not exposed, and this is preferable from an anti-theft point of view.

The rod-shaped body 90 may be provided in the openable and closable member 212 in advance. The rod-shaped body 90 is biased by a spring member, not shown, to project from the second through hole 212c. In this embodiment, the rod-shaped body 90 is curved so as not to interfere with a rotation of the operation member 20.

The invention is not limited to the embodiments that have been described heretofore, and hence, modifications such as various design changes can be made to the embodiments based on the knowledge of those skilled in the art to which the invention pertains. The resulting modifications from those modifications can also be included in the scope of the invention.

In the embodiments, the first rod 26 is caused to reciprocate by the transmitting portion 40 formed on the operation member 20. However, the invention is not limited thereto. The projecting portion 64 of the cylinder lock 30 may function as the transmitting portion which causes the first rod 26 to reciprocate. With the cylinder lock 30 left in an unlocking state, the projecting portion 64 of the cylinder lock 30 is brought into engagement with the first rod 26, while with the cylinder lock 30 left in the locking state, the projecting portion 64 is disengaged from the first rod 26. Since the projecting portion 64 is disengaged from the first rod 26 with the cylinder lock 30 left in a locking state, the operation member 20 can rotate. However, since the projecting portion 64 functioning as the transmitting portion does not push the first rod 26, the first rod 26 is not allowed to recede.

In addition, in the embodiments, the step of rotating the cylinder lock 30 using the key 70 is described as one of the conditions under which the cylinder lock 30 is removed, however, the invention is not limited thereto. In another modified example, a cylinder lock 30 may be removed without being rotated using a key 70. In this modified example, with the cylinder lock 30 staying in its locking state, a protruding portion 66 is positioned on an extension of a receding direction 80 of a pushing portion 26d of a first rod 26. Then, the cylinder lock 30 is removed from an operation member 20 through a step of pushing in the first rod 26 and a step of pulling out the cylinder lock 30. In the step of pulling out the cylinder lock 30, a magnet may be used to attract the cylinder lock 30 securely for removal from the operation member 20.

In the lock device 10 of the first embodiment, the first rod 26 and the second rod 28 are described as being brought into engagement with the corresponding lock holes. However, the invention is not limited thereto. For example, the first rod 26 and the second rod 28 may be brought into engagement with projecting portions or recess portions on the fixed member or may be brought into engagement with edges of walls of the fixed member. Namely, surfaces with which the first rod 26 and the second rod 28 are brought into engagement should make up of the fixed member, and portions on the fixed member which enable the first rod 26 and the second rod 28 to be brought into engagement therewith are referred to as locking portions.

In the lock device 10, the engaging portion 49 which is brought into engagement with the protruding portion 66 of the cylinder lock 30 is made up of the rear edge of the cylinder bore 46. However, the invention is not limited thereto. An engaging portion which is brought into engagement with the protruding portion 66 should be formed, for example, on the rear side of the operation member 20 so as to protrude from the transmitting portion 40. In either of the cases, the engaging portion is brought into engagement with the protruding portion 66 to restrict the cylinder lock 30 from moving in the axial direction towards the front side of the operation member 20 or the openable and closable member 12.

BRIEF DESCRIPTION OF REFERENCE NUMERALS

10 Lock Device; 12 Openable and Closable Member; 12a Mounting Opening; 12b Depressed Portion; 12c First Supporting Hole Portion; 12d Second Supporting Hole Portion; 12e Through Hole; 12f Side Wall; 14 Glove Box; 14a Lock Hole; 20 Operation Member; 22 Base Member; 24 Rotary Member; 26 First Rod; 26b First Coupling Portion; 26c Bearing Surface; 26a Distal End Portion; 26d Pushing Portion; 26e First Branch Portion; 26f Second Branch Portion; 26g End Portion; 28 Second Rod; 28b Second Coupling Portion; 30 Cylinder Lock; 35 Base Portion; 36 Operating Portion; 38 Shaft Portion; 40 Transmitting Portion; 42 Side Wall Portion; 44 Middle Wall Portion; 46 Cylinder Bore; 47 Inward Flange; 48 Base Frame Portion; 50 Passage Portion; 52 Stopper Portion; 54 Pivotally Supporting Portion; 56 Seat Portion; 60 Outer Cylinder Portion; 62 Inner Cylinder Portion; 62a Flange; 62b Inserting Hole; 64 Projecting Portion; 66 Protruding Portion; 68 Inserting Opening; 70 Key; 90 Rod-Shaped Body.

INDUSTRIAL APPLICABILITY

The invention relates to the lock device to be mounted on the openable and closable member.

The invention claimed is:

1. A lock device capable of holding an openable and closable member in a closed state, the openable and closable member being mounted on an opening portion of a fixed member so as to be opened and closed, the lock device comprising:
a base member fixed to the openable and closable member;
an operation member supported on the base member;
a rod configured to reciprocate in association with operations of the operation member to thereby be brought into engagement with and disengagement from a locking portion on the fixed member; and
a cylinder lock disposed in a cylinder accommodating portion formed in the base member or the operation member,
wherein the cylinder lock comprises a protruding portion configured to be biased to protrude radially outwards to thereby be brought into engagement with an engaging portion formed on a rear side of the cylinder accommodating portion, and
wherein the rod comprises:
a distal end portion configured to move out of a through hole formed in the openable and closable member to be brought into engagement with the locking portion on the fixed member over a predetermined length with the openable and closable member left in a locked state; and
a pushing portion enabling a release of an engagement with the engaging portion when the rod moves in a receding direction to be brought into abutment with the protruding portion, causing the protruding portion to recede against a biasing force.

2. The lock device according to claim 1, wherein the pushing portion releases an engagement between the protruding portion and the engaging portion when the rod moves more than the predetermined length in the receding direction.

3. The lock device according to claim 1, wherein the pushing portion pushes the protruding portion by the rod being pushed in the receding direction with the openable and closable member left in an opened state.

4. A lock device capable of holding an openable and closable member in a closed state, the openable and closable member being mounted on an opening portion of a fixed member so as to be opened and closed, the lock device comprising:
a base member fixed to the openable and closable member,
an operation member supported on the base member,
a rod configured to reciprocate in association with operations of the operation member to thereby be brought into engagement with and disengagement from a locking portion on the fixed member; and
a cylinder lock disposed in a cylinder accommodating portion formed in the base member or the operation member,
wherein the cylinder lock comprises a protruding portion configured to be biased to protrude radially outwards to thereby be brought into engagement with an engaging portion formed on a rear side of the cylinder accommodating portion,
wherein the protruding portion is disposed so that a rod-shaped body inserted in a through hole formed in a side wall of the openable and closable member is configured to be brought into abutment therewith,
wherein the through hole is not exposed with the openable and closable member left in the closed state, and
wherein the rod-shaped body is biased to project from the through hole.

5. A lid member for a glove box, which is attachable to an opening portion of the glove box in an openable and closable manner, the lid member comprising:
a side wall formed with a through hole; and
a lock device capable of holding the lid member in a closed state, wherein the lock device comprises:
a base member fixed to the lid member;
an operation member supported on the base member;
a rod configured to reciprocate in association with operations of the operation member to thereby be brought into engagement with and disengagement from a locking portion on the fixed member; and
a cylinder lock disposed in a cylinder accommodating portion formed in the base member or the operation member,
wherein the cylinder lock comprises a protruding portion configured to be biased to protrude radially outwards to thereby be brought into engagement with an engaging portion formed on a rear side of the cylinder accommodating portion, wherein the lid member is configured such that the cylinder lock is removable from the lock device by putting the lid member in an opened state, inserting a rod-shaped body in the through hole formed on the side wall of the lid member to bring the rod-shaped body into abutment with the protruding portion of the cylinder lock, and pushing the rod-shaped body to disengage the protruding portion from the engaging portion, wherein, when the lid member is in the closed state, the through hole is not exposed to the outside, and wherein the through hole penetrates through the side wall of the lid member in a direction in which the rod reciprocates so that the rod-shaped body is configured to be inserted in the through hole along the rod.

6. The lid member according to claim 5, further comprising a wall portion formed with a guide hole through which the rod-shaped body is configured to pass, and wherein the through hole and the guide hole are arranged in the direction in which the rod reciprocates.

7. The lid member according to claim 5, wherein a guide hole is provided in the lid member, the rod-shaped body being configured to pass through the guide hole.

8. The lid member according to claim 7, wherein the through hole and the guide hole are arranged in the direction in which the rod reciprocates.

9. The lid member according to claim 5, wherein the through hole and a guide hole, through which the rod-shaped body is configured to pass, are arranged in the direction in which the rod reciprocates.

10. The lid member according to claim 5, wherein the rod-shaped body is biased to project from the through hole.

11. The lid member according to claim 5, wherein the cylinder accommodating portion is formed in the base member.

12. The lid member according to claim 5, wherein the cylinder accommodating portion is formed in the operation member.

* * * * *